United States Patent [19]
Bajwa

[11] Patent Number: 5,742,781
[45] Date of Patent: Apr. 21, 1998

[54] DECODED INSTRUCTION BUFFER APPARATUS AND METHOD FOR REDUCING POWER CONSUMPTION IN A DIGITAL SIGNAL PROCESSOR

[75] Inventor: Raminder Singh Bajwa, Milpitas, Calif.

[73] Assignee: Hitachi America, Ltd., Tarrytown, N.Y.

[21] Appl. No.: 694,669

[22] Filed: Aug. 9, 1996

[51] Int. Cl.$^6$ .................. G06F 9/30; G06F 1/32
[52] U.S. Cl. .......................... 395/384; 395/750
[58] Field of Search ................ 395/750, 250, 395/568, 588, 384, 590, 595, 598

[56] References Cited

U.S. PATENT DOCUMENTS

| | | | |
|---|---|---|---|
| 3,959,783 | 5/1976 | Fressineau et al. | 365/200 |
| 4,449,184 | 5/1984 | Pohlman, III et al. | 395/250 |
| 4,566,063 | 1/1986 | Zolnowsky et al. | 395/588 |
| 4,638,423 | 1/1987 | Ballard | 395/500 |
| 5,018,061 | 5/1991 | Kishigami et al. | 395/403 |
| 5,123,107 | 6/1992 | Mensch, Jr. | 395/800 |
| 5,203,003 | 4/1993 | Donner | 395/800 |
| 5,388,265 | 2/1995 | Volk | 395/750 |
| 5,392,437 | 2/1995 | Matter et al. | 395/750 |
| 5,410,714 | 4/1995 | Yorimoto et al. | 395/750 |
| 5,418,969 | 5/1995 | Matsuzaki et al. | 395/750 |
| 5,430,881 | 7/1995 | Ikeda | 395/750 |
| 5,454,114 | 9/1995 | Yach et al. | 395/750 |
| 5,471,624 | 11/1995 | Enoki et al. | 395/750 |
| 5,485,625 | 1/1996 | Gumkowski | 395/800 |
| 5,495,617 | 2/1996 | Yamada | 395/750 |
| 5,511,013 | 4/1996 | Tokieda et al. | 364/707 |
| 5,515,539 | 5/1996 | Ohashi et al. | 395/750 |
| 5,515,540 | 5/1996 | Grider et al. | 395/750 |
| 5,530,932 | 6/1996 | Carmean et al. | 395/750 |
| 5,537,656 | 7/1996 | Mozdzen et al. | 395/750 |
| 5,560,024 | 9/1996 | Harper et al. | 395/750 |

OTHER PUBLICATIONS

*SRAM Cells for Low–Power Write in Buffer Memories*, Jonas Alowersson and Per Andersson; IEEE Symposium on Low Power Electronics; Oct. 1995; pp. 60–61.

*Multimedia Complex on a Chip*, Hajime Sasaki; 1996 IEEE International Solid–State Circuits Conference.

*Power Consumption Estimation in CMOS VLSI Chips*, Dake Liu and Christer Svensson; IEEE Journal of Solid–State Circuits, vol. 29, No. 6, Jun. 1994.

*The Memory Wall and the CMOS End–Point*, M. V. Wilkes; Computer Architecture News, 23 (4):4–6, Sep. 1995.

Primary Examiner—Parshotam S. Lall
Assistant Examiner—Viet Vu
Attorney, Agent, or Firm—John J. Sideris, Esq.

[57] ABSTRACT

The present invention is directed to a digital signal processor having a local buffer for storing decoded instruction words during the first pass through a program loop, so that subsequent iterations through the program loop can be accomplished without the use of the instruction fetch and decode circuitry, thereby saving power.

17 Claims, 5 Drawing Sheets

DECODED INSTRUCTION BUFFER APPARATUS AND METHOD FOR REDUCING POWER CONSUMPTION IN A DIGITAL SIGNAL PROCESSOR

FIELD OF THE INVENTION

The present invention relates in general to digital signal processors, and in particular to reducing the power consumption of a digital signal processor by storing highly repetitive decoded instructions in a local, high speed buffer from which the instructions can be accessed for subsequent iterations.

BACKGROUND OF THE INVENTION

In recent years, the demand for mobile or portable electronic devices of all sorts has grown tremendously. Because of advances in microelectronic circuitry sizes and battery technology, portable applications have grown from conventional low performance products such as wrist watches and calculators to high performance products such as notebook computers, personal digital assistants, camcorders and cellular telephones. The versatile functionality of high performance portable devices typically requires high computation speeds, however with low power consumption.

Reducing power consumption in portable devices translates directly into longer operational time while increasing the size and weight of the batteries. In addition, reducing power consumption also means reduced heat in the integrated circuitry. For both portable and non-portable devices, reduced heat allows for more transistors to be integrated into a single chip or on a multichip module. This allows increased functionability in a smaller package, which is particularly important in voice/video communications and multimedia applications. Moreover, reduced circuit heat allows for the use of less expensive packaging technology without suffering reliability. As can be appreciated, cost reduction is another important consideration in portable devices.

System designers of portable devices are increasingly using digital signal processors ("DSP"s) as the central processing unit because of the DSP's ability to quickly process large amounts of "real world" numerical data. A DSP processes "real world" signals such as voltages, pressures and temperatures by converting these analog signals into their digital equivalents at discrete time intervals for processing in the digital domain. The result is an array of numerical values stored in memory, which can be repetitively processed at high speeds.

To reduce the power consumption of the DSP, many system designs have produced low-voltage versions and/or have added power management features to provide greater control over a processor's power consumption. Power management features available on some DSPs include:

Reduced voltage operation. Several DSPs are designed to operate on 3.3 volts Some DSPs can operate at 3.0 volts as well.

"Sleep" or "idle" modes. Many DSPs provide power-down modes that turn off the clock to certain sections of the processor, reducing power consumption.

Programmable clock dividers. Some newer DSPs allow the processor's clock frequency to be varied under software control. System designers can use the minimum clock speed required for a particular task.

Peripheral control. Some DSPs allow the programmer to disable peripherals that are not in use.

Going a step further, system designers have attempted to reduce the number of process slops taken to complete certain functions with the DSP in order to save power. For example, system designers have devised techniques for reducing spurious transactions in the process steps in multiplier and adder sections the DSP. System designers have also implemented circuit level optimizations and CAD techniques to squeeze out additional power consumption reductions. However, most of the research to date has focused on the data path for power reduction on the assumption that the cost in terms of performance can be minimized the most here. Research in the reduction of power consumed by the instruction code path, in particular instruction word storage and execution has been neglected as a result.

Access of the instruction set memory is a significant contributor to the consumption of DSP power because instruction memory is accessed in almost every cycle. In theory, by reducing the need to access the instruction memory, the power consumption of the DSP should decrease. For example, by localizing the instruction words, the need to repeatedly access the instruction memory can be reduced.

The AT&T Hobbit microprocessor uses a variable length instruction set architecture in which decoded instructions are stored in a local instruction cache. While instruction cache memory is very important for performance, it is a major consumer of the DSP's power because of its use for almost every cycle's operation. Moreover, every instruction in the Hobbit microprocessor is decoded and stored in the local instruction cache to reduce the inherent performance penalty of variable length decoding. This causes the instruction cache to be used even in acyclic operations, adding to power consumption. In addition, if the local instruction cache suffers a miss, the microprocessor has to fetch a new instruction from the instruction cache memory. As can be seen, this approach does not necessarily lend itself to power reduction: rather, it addresses concerns about performance.

Likewise, some DSPs provide a special loop instruction or repeat instruction which allows the programmer to implement a program loop without expending any additional instruction fetch cycles. This provides increased processing throughout. However, the only power saved is the power that would have been spent from not repeating the fetching operations. The power consumed by repeatedly decoding the instructions remains unchanged.

Accordingly, what is needed is an apparatus and method for selectively reducing the DSP power consumption used by repeated access to the instruction code set.

It is therefore, an object of present invention to provide a circuit and method selectively reducing the power consumption of a DSP attributed to fetching and decoding instruction words.

It is another object of the present invention to provide a circuit and method for reducing the heat dissipation of a DSP to increase its reliability and reduce integrated circuit packaging costs.

It is still another object of the present invention to accomplish to above-stated objects by utilizing a DSP core circuit and method which is simple in design and use, and economical to perform from a power usage standpoint.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an apparatus is disclosed for an integrated circuit digital signal processor having (i) an arithmetic logic unit, for performing decision making, arithmetic logic operations and data manipulation; (ii) an array of data memory for storing data operands in different locations within the data memory; (iii) an address generation unit coupled to the data memory, for generating addresses to access different storage locations within the data memory; (iv) an array program memory for storing instruction words in different locations within the instruction memory; and (v) a program control unit coupled to the program memory for accessing, storing and retrieving instruction words from the program memory. The program control unit further includes an instruction fetching unit for retrieving the instruction words, a decoder unit for decoding the instruction words into control signals and operands, and a decoded instruction buffer for storing decoded instruction words therein to avoid repeatedly fetching and decoding instruction words when executing program loops.

A method of the present invention provides for reducing the power consumption in a digital signal processor having an arithmetic logic unit, an array of data memory, an address generation unit, an array of program memory, and a program control unit having an instruction fetch unit, an instruction decode unit and a buffer for storing decoded instructions. The method comprises the steps of fetching at least one instruction from the program memory; decoding the instruction into control signals and storing the decoded instruction in the buffer; retrieving the decoded instruction from the buffer instead of retrieving the instruction from the program memory for subsequent uses of the instruction; and powering down the instruction fetch unit and the decode unit while decoded instructions are retrieved from the buffer. This method has particular application on the execution of program loops or program subroutines.

DETAILED DESCRIPTION OF THE PREFERRED EMBODIMENTS OF THE INVENTION

The present invention contemplates a digital signal processor having a local buffer for storing decoded instruction words during the first pass through a program loop, so that subsequent iterations through the loop can be accomplished without the use of the instruction fetch and decode circuitry, thereby saving power.

Figure 1:
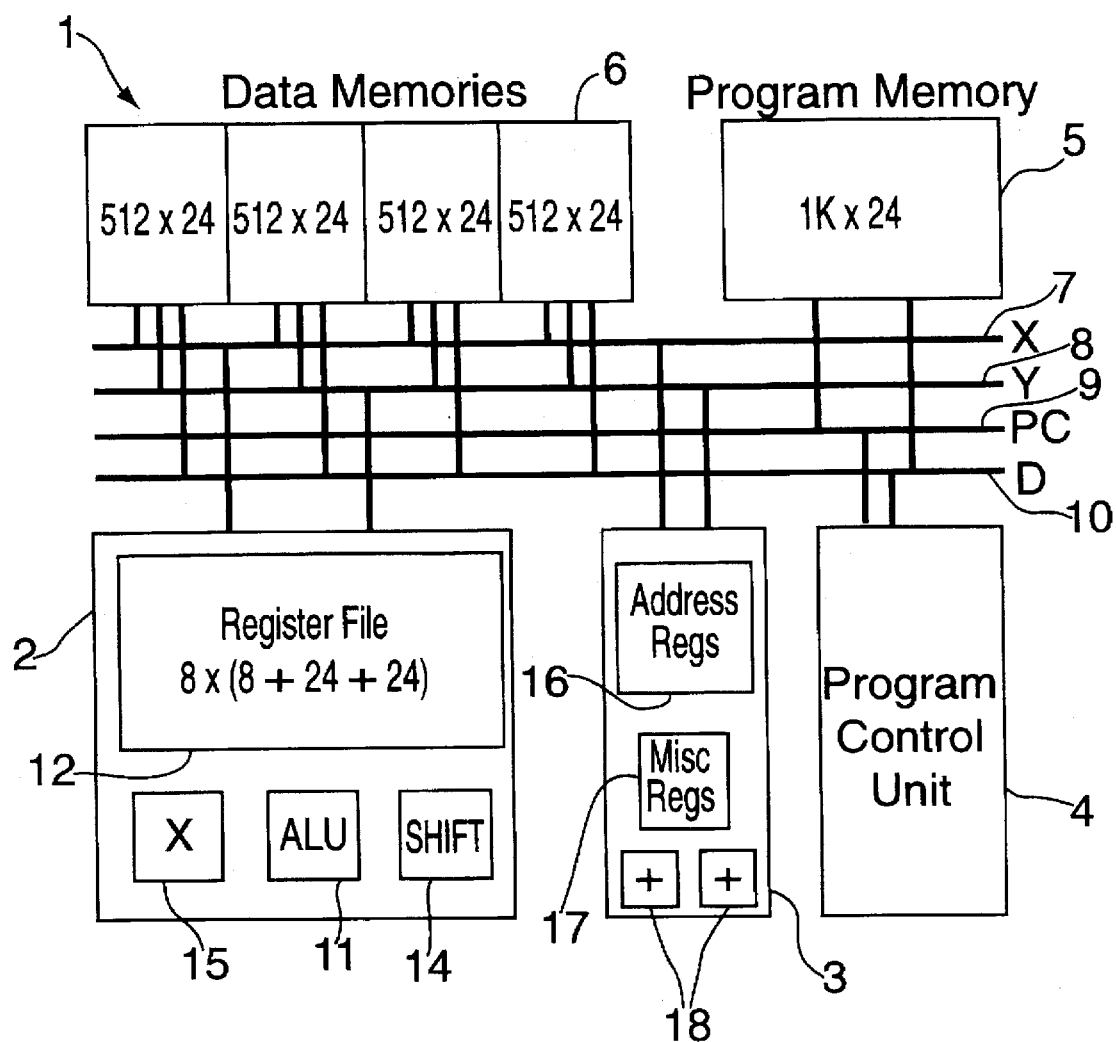
FIG. 1 is a block diagram of a digital signal processor core, according to the present invention.

Referring now to the drawings, wherein like numerals refer to like elements, there is disclosed in FIG. 1 broad aspects of a preferred embodiment of the invention. It is to be understood that the references to a digital signal processor ("DSP"), related to but not forming part of the invention, are provided for illustrative purposes only. References to the DSP and its components are provided for ease in understanding how the present invention may be practiced in conjunction with known types of signal processing applications.

FIG. 1 discloses a general arrangement of a programmable digital signal processor ("DSP") core 1 as used in a computer system. It should be noted that the DSP 1 is not limited to a DSP core, which is designed to be incorporated into an ASIC design, and that a chip embodiment can be used with equal facility in the present invention. Moreover, the various components of the DSP 1 contemplated by the present invention may be implemented by direct electrical connection through customized integrated circuits, or a combination of circuitry and programming, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the DSP 1 that would still be within the scope of the invention.

The arrangement shown in FIG. 1 is preferably for signal processing, but the functions described below may be applied in microprocessor systems of various configurations and applications. The DSP 1 may be any microcomputer that can process large buffers of numerically intensive data by quickly executing repetitive multiplications, additions, accumulations and other arithmetic and Boolean operations. In the preferred embodiment, the DSP 1 is well suited for performing high volume applications such as fast fourier transforms, convolutions and digital filtering.

According to one embodiment of the present invention, the DSP 1 contains, in pertinent part, a data execution unit 2, an address generation unit 3, and a program control unit 4. The DSP 1 also contains a program memory 5 which may be composed of read only memory (ROM), random access memory (RAM), and preferably a combination of both. As practiced in the industry, the program memory 5 contains data inputs and outputs for reading and writing thereto, and address inputs for selecting the array location during such read and write operations. In the preferred embodiment, the program memory 5 is a 1K by 24 bit ROM for storing 24-bit DSP instruction words therein.

The DSP 1 also contains an array of data memories 6 composed of 512×24 bit RAM. In the preferred embodiment, 48 kilobits of RAM is provided for data storage. Similar to the program memory 5, the data memory 6 includes data inputs, data outputs, and address inputs so that data operands can be read from or written to specific locations in the array 6.

The data execution unit 2, the address generation unit 3, the program control unit 4, the program memory 5 and the array of data memories 6 are all interconnected via a plurality of address and data busses having suitable bus interfaces and switching logic controlled by the DSP 1 for transmitting address information and data within the DSP 1. The DSP 1 incorporates the Harvard architecture by using separate internal busses for data and instructions, which include parallel address/data bus combinations X 7 and Y 8 for obtaining and transmitting data operands within the DSP 1. Also provided is instruction address bus PC 9 for locating instruction codes, and instruction data bus D 10 for fetching the instruction.

In the preferred embodiment, address/data data bus X 7 is a combination of an 18-bit address bus for communicating memory address information to memory address decoders (not shown for clarity) associated with the array of data memories 6 to locate the desired data, and a 24-bit data bus for communicating data operands to and from the data memories 6. The address/data bus Y 8 is identical to the address/data bus X 7 in that it is also a combination of an 18-bit address bus and 24-bit data bus. The duplicative bus structure allows the DSP 1 to feed two data operands (one data and one coefficient, usually stored in different pages of memory) to the data execution unit 2, at the same time an instruction code is fetched, and all within one cycle. Finally, instruction address bus PC 9 and instruction data bus D 10 is also a combination of an 18-bit address bus and 24-bit data bus, respectively.

The data execution unit 2 further includes an arithmetic logic unit ("ALU") 11, a shifter 14, a multiplier 15, and an array of data registers 12. All of these elements are interconnected through internal busses 30 within the data execution unit 2.

The ALU 11 is a 56-bit general purpose arithmetic unit that operates on 24-bit data words, or decoded instruction words, to produce a 48-bit result. In addition to typical arithmetic operations such as addition and subtraction, the ALU 11 performs decision making Boolean operations, processing operations and logic operations such as AND, OR and EXCLUSIVE-OR on the data being input. For decision making operations, the ALU 11 compares which of two numbers is larger or smaller, whether a number equals zero, and whether a number is positive or negative.

The ALU 11 works in conjunction with a number of registers in the data register file 12 for temporarily storing data, on which logical and mathematical operations are performed. In a preferred embodiment of the present invention, the data register file 12 contains at least two and preferably more accumulator registers, and several general purpose storage registers. The data register file 12 contains at least eight registers (0–7). Data operands are loaded into the ALU 11 through data inputs, while the results are communicated via data outputs. The output of ALU 11 is stored in at least one accumulator register, or any other register in the data register file 12.

The shifter 14 is a 56-bit barrel shift register which can perform logical and arithmetic shift operations, including rotate operations in left or right directions. The capabilities of the shifter 14 enable the DSP 1 to perform functions such as, for example, numerical sealing, bit extraction, and extended arithmetic, as are commonly practiced in the industry.

The multiplier 15 performs 24×24 bit 2s complement multiplication with a 48 bit result in a single instruction cycle. As practiced in the industry, the multiplier 15 contains an array of adders constructed in dynamic/static logic. A 24 bit multiplicand is provided from the data bus of either the X 7 address/data bus or the Y 8 address/data bus to the array. The other input to the multiplier 15, typically provided from the data bus of either the X 7 address/data bus or the Y 8 address/data bus or in some cases from an instruction word (e.g. the multiply immediate instruction), is a 24 bit multiplier operand that is applied to a set of Booth encoders (not shown) which produce a set of outputs having two of the following five functions: shift or no shift; add, subtract or zero. The Booth encoder reduces the number of partial products that the multiplier 15 would have to do in classic multiplication procedure by approximately one-half through an algorithm that treats 2 bits of the multiplier each time (2 Radix), instead of one.

In the address generation unit 3, a combination of 18-bit address registers 16 and two adders 18 are contained therein. These address registers 16 operate with the use of adders 18 in order to access the high order of addresses in the data memories 6. The address is transmitted from address outputs of the address generation unit 3 to the address inputs of the data memory 6 via address/data busses X7 and/or Y8. The address registers 16 include source address and destination address registers, a pointer register, and several interrupt registers. In addition, the address generation unit 3 may include miscellaneous registers 17 for establishing memory boundaries and for handling address branches, such as, for example, base address registers, boundary registers, jump address registers, etc.

The program control unit 4 operates on 24-bit instruction words or codes retrieved via internal data inputs from the data outputs of program memory 5. In the program control unit 4, instruction words are fetched from an address in the program memory 5, as specified in the instruction address communicated through address outputs of the program control unit 4 to the address inputs of program memory 5, over instruction bus PC 9. The program control unit 4 decodes the retrieved instruction word and produces corresponding operands and control signals. These signals control operations such as reading data from data memory array 6, writing data to data memory array 6, processing data by the data execution unit 2, etc. In a preferred embodiment of the present invention, the fetch, decode and control signal production occurs in a parallel pipelined manner so that several instruction words are processed in the different stages at the same time. In other words, after a first instruction word has been fetched from program memory 5, a second instruction word is fetched while the first instruction word is being decoded, and so on.

Figure 2:
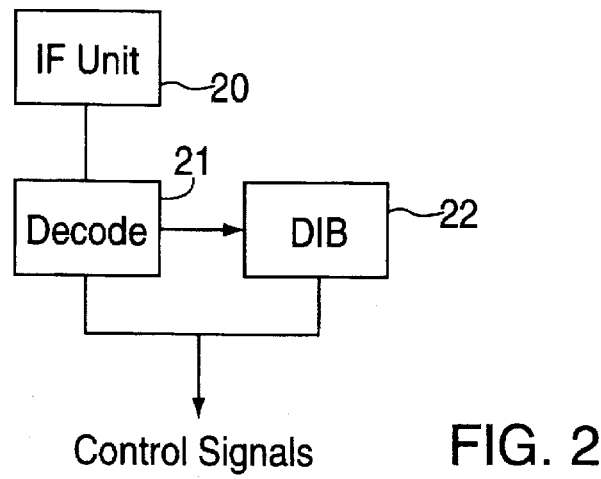
FIG. 2 is a block form diagram of pertinent parts of a program control unit according to the present invention.

As shown in FIG. 2, the program control unit 4 includes an instruction fetch unit ("IF") 20, and decode logic 21. The program control unit 4 further includes a decoded instruction buffer ("DIB") 22. Instruction words are fetched under the control of IF unit 20 and communicated to the decode logic 21. After an instruction word is decoded into the appropriate control signals, it may be both stored in the decode instruction buffer 22 and communicated out of the program control unit 4 onto instruction data bus D 10 for appropriate action, or simply communicated out of the program control unit 4. As described in detail below, depending on the program being executed, decoded instructions may be provided from the decode logic 21 or the decoded instruction buffer 22.

Figure 3:
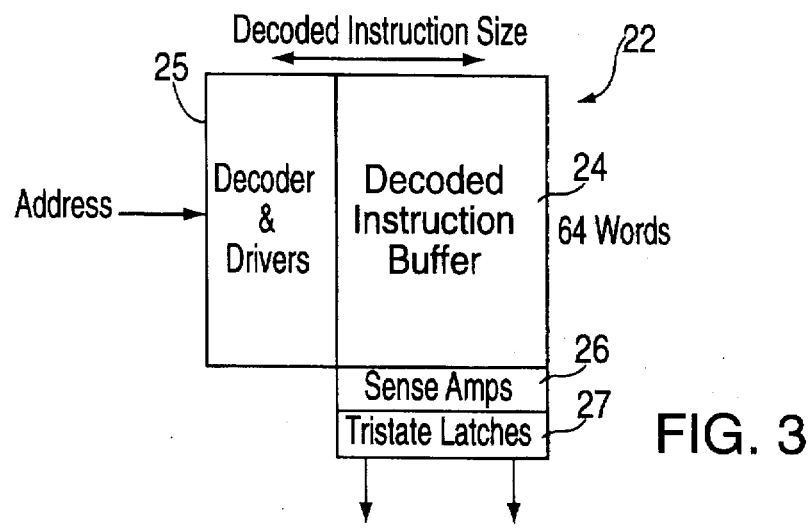
FIG. 3 is a schematic diagram of the decoded instruction buffer of one embodiment of the present invention.

Turning now to FIG. 3, there is shown the decoded instruction buffer 22 in greater detail. The decoded instruction buffer 22 contains a memory array 24 that is preferably 92-bits wide. The decoded instruction buffer 22 is made of a static random access memory (SRAM) that can store anywhere from 32 to 256 instruction words. In the preferred embodiment, the decoded instruction buffer 22 stores 64 instruction words.

Figure 4:
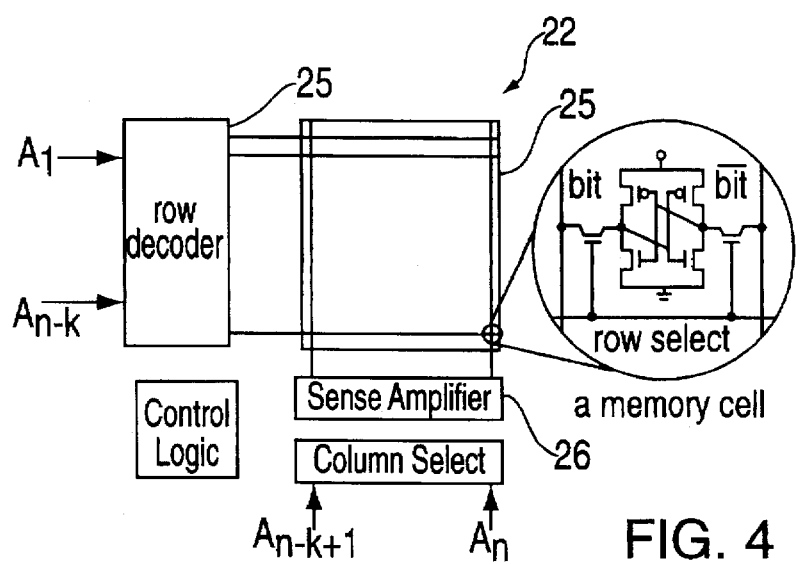
FIG. 4 is a more detailed perspective diagram of the decoded instruction buffer of one embodiment of the present invention.

As shown in the encircled enlargement of FIG. 4, the memory array 24 is preferably composed of a plurality of six transistor memory cells, but not so limited. The preferred embodiment employs 0.8μscaleable CMOS technology with two layers of metal. By using six transistor cells in the preferred embodiment, instead of eight transistor cells for example, the overhead in terms of both space and power usage can be minimized with respect to the benefits achieved by employing the decoded instruction buffer 22.

With reference back to FIG. 3, decoded instruction words stored in memory array 24 are located by address decoder and drivers 25. Once obtained, the decoded instruction words are output through sense amplifiers 26 and tristate latches 27 which act as a register to temporarily store the control signals before application.

Figure 5A:
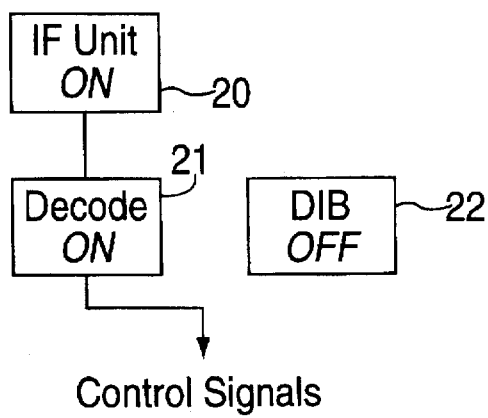
FIGS. 5a–c are flow diagrams of the operation of the decoded instruction buffer according to one embodiment of the present invention.
Figure 5B:
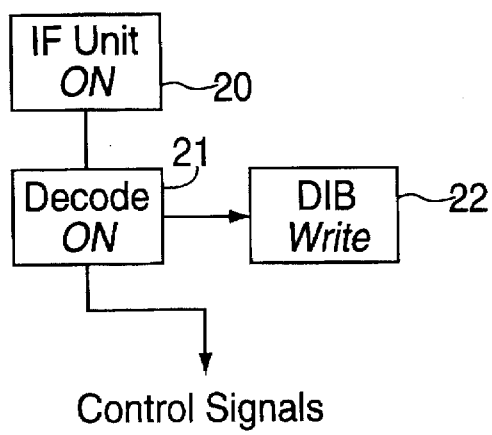
Figure 5C:
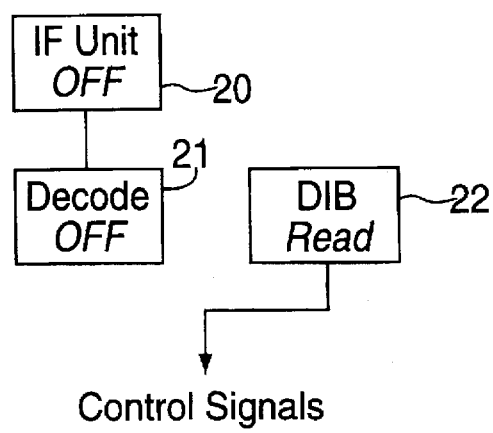

The operation of the program control unit 4 containing the decoded instruction buffer 22 will now be described with reference to FIGS. 5a–c. Many DSP 1 applications, such as signal/image processing programs, involve computations built around convolutions, transforms and other matrix computations. These common applications are dominated by the cyclic execution of a few instructions (typically 80–90% of the dynamic instruction count is from loops). In performing a cyclical program loop such as for example:

```
for(i = 0; i < MAX_ITER; i++) {
    c+ = a[i] + b[i];
}
``` the feeling, decoding and subsequent execution of the multiply accumulate operation is repeated MAX_ITER number of times before the loop terminates.

Initially, the DSP 1 of the present invention is in a non-loop state when it begins executing this cyclic program (or any other program loop), and the decoded instruction buffer 22 will be in an off condition. Instruction words are fetched by the instruction fetch unit 20, passed to the decode logic 21 for transformation into control signals, and communicated out of the program control unit 4 (FIG. 5a). At the first loop instruction, the program control unit 4 switches to a first pass state in which the decoded instruction buffer 22 is selectively loaded with the control signals from the decode logic 21 (FIG. 5b). During pipelined operation, the instruction fetch unit 20, the decode logic 21 and the decoded instruction buffer 22 are all operating in parallel, consuming maximum power.

Upon the next loop iteration, the program control unit 4 reads the decoded control signals from the decoded instruction buffer 22. Advantageously, the instruction fetch unit 20 and the decode logic 21 are powered down at this point in order to conserve power (FIG. 5c). In a preferred embodiment of the present invention, because data memory 6 is separated from both the program memory 5 and the program control unit 4, the data memory 6 bit lines do not need to be driven (or precharged) during this power saving state, providing further energy savings.

The program control unit 4 continues to operate in this power saving state for the entire duration of the program loop execution, and starts up the instruction fetch unit 20 and the decode logic 21 two cycles before the end of the last iteration. At this step, which can be detected through use of a program counter (not shown), the instruction fetch unit 20 and the decade logic 21 are powered on and the next instruction word is fetched. In this pipelined manner, the decoded instruction buffer 22 can be ready for the next loop instruction. Alternatively the instruction fetch unit 20 and the decode logic 21 can remain powered off until the very end of the loop program.

When handling nested loops, the program counter can be monitored to allow the program control unit 4 to distinguish between different program loop instructions. In addition, special instruction words may be used for switching between a program loop being executed and a nested program loop.

Figure 6A:
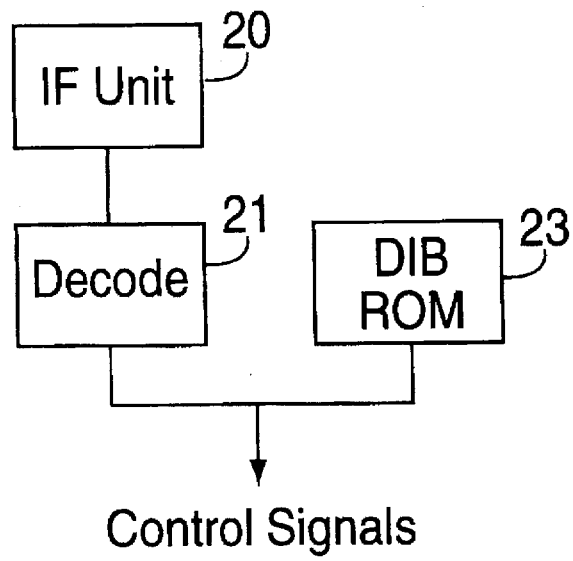
FIGS. 6a–b are block diagrams of additional embodiments of the decoded instruction buffer, according to the present invention.
Figure 6B:
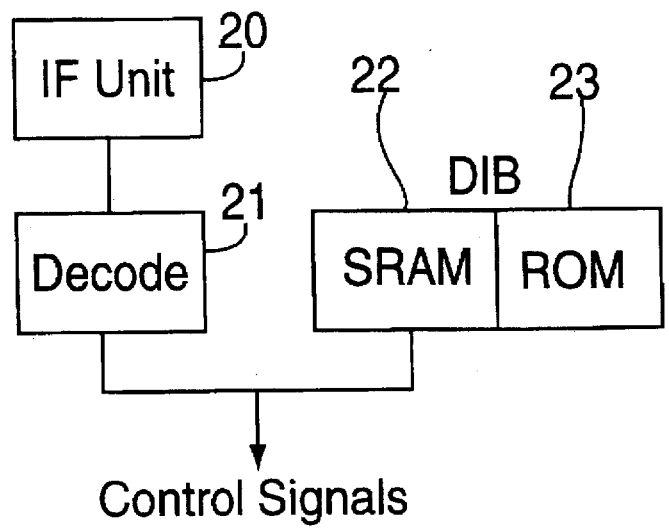

Additional embodiments of the decoded instruction buffer 22 are shown in FIGS. 6a–b. FIG. 6a discloses a decoded instruction buffer 23 as a read only memory (ROM) array instead of the SRAM embodiment. This arrangement can be used in the case of embedded applications or user programs where the DSP 1 has to run a small set of subroutines, program kernels, shared code or "subtasks" a large number of times. For example, some DSP applications repeatedly use subtasks that include numerically intensive computations such as FIR filtering, Fast-Fourier-Transform and convolutions. Such subtasks are typically a very small computer program comprising of just 10–50 lines of code. However, in one run of a DSP application they may execute for a large number of cycles (hundreds or thousands of times). In such a case, a reduced program code size for the DSP application can be used by permanently storing these often used subroutines, subtasks, etc. in a decoded form in the ROM decoded instruction buffer 23.

In this embodiment, the ROM decoded instruction buffer 23 acts as an on-chip library of subroutines for use at run time by the DSP application program. The size of the DSP application then can be reduced by making calls to these library subroutines instead of replicating them. The DSP application can simply make calls to the subroutines, program kernels, etc., in place of repeating the entire subroutines, etc., throughout the application code. Accordingly, in this embodiment, the code size of the DSP application can be greatly reduced. Because ROMs are approximately four times or more denser than SRAMs, a larger size ROM decoded instruction buffer 23 can be used in the same physical space that a SRAM embodiment would occupy, to provide localized storage of many of the often used program subroutines, kernels and the like.

In yet another embodiment of the present invention, the decoded instruction buffer 22 in its SRAM form is combined with the ROM decoded instruction buffer 23 to form a hybrid storage buffer (see FIG. 6b). This embodiment provides the benefits of both the SRAM embodiment and the ROM embodiment, namely reduced DSP application code size and reduced power consumption. This hybrid embodiment permits the execution of a large DSP application, or multiple DSP applications, loaded in the SRAM decoded instruction buffer 22, while the often repeated subroutines are stored in the ROM decoded instruction buffer 23. In this manner, the SRAM decoded instruction buffer 22 is used more efficiently. Notably, because a larger ROM storage space can be provided in the same area as the replaced SRAM portion, the need to fetch program code from off-chip memories is also reduced, yielding further power savings. This hybrid embodiment reduces the DSP application code size while still retaining flexibility for the programmer.

Figure 7:
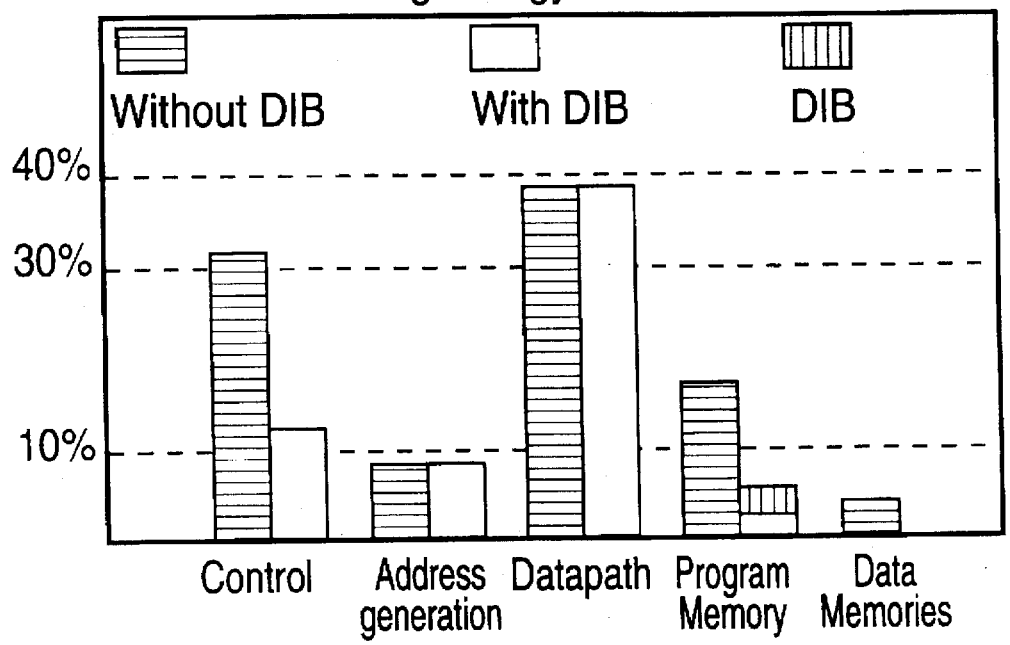
FIG. 7 is a graphical representation of the power consumption of selective components of the digital signal processor, with and without the decoded instruction buffer of the present invention.

FIG. 7 is a graphical representation of the power savings in the DSP 1 of the present invention, with and without the decoded instruction 23 buffer activated. In this graph, the memory power consumption is shown divided between the data memories 6 (in which no more than two 512K banks are typically active in one cycle) and the instruction memory 5. As can be seen, the instruction memory 5 consumes a larger percentage of the DSP 1 power than the data memory 6. One reason is that the instruction memory 5 is twice the size of the memory array 6 being accessed within each separate cycle. Another reason is that the data memory 6 is not accessed as frequently as the program memory 5 because, for example, compilers and code writers optimize code to maximize the use of the data register file 12 to reduce repeated access of data memory array 6.

It should be noted that the control power bar shown in the left hand side of FIG. 7 represents the power consumed in the decoder logic 21, along with other power consumers in the DSP 1 such as the program counter, loop counters and the bus arbiter (the bus arbiter, not shown, controls access to the data bus D 10 when data memory 6 and program memory 5 are both seeking to use it). As FIG. 7 indicates, power consumption significantly decreases for both the control power consumption and power consumed by the program memory 5 when the decoded instruction buffer 22 is used. Taking into account the power consumed by the operation of the decoded instruction buffer 22 itself, the total power savings is about 26% overall.

Figure 8:
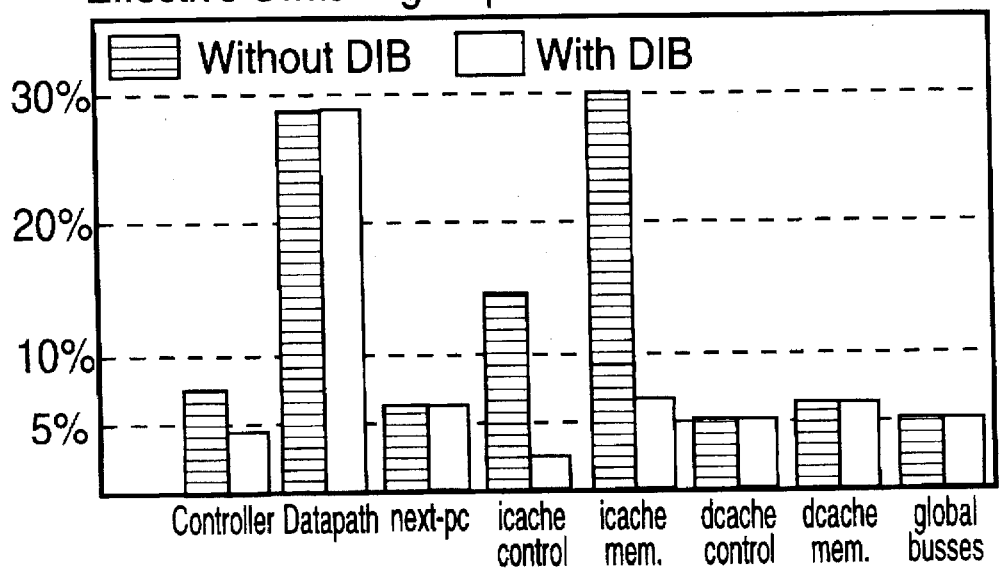
FIG. 8 is a graphical representation of the power consumption of selective components of another embodiment of the digital signal processor, with and without the decoded instruction buffer of the present invention.

FIG. 8 shows a similar type power savings in a DSP 1 embodiment that uses a separate cache memory for instruction words. Such instruction caches, which inherently consume a lot of power because they are accessed almost every cycle, are typically used to enhance DSP 1 performance. Instruction caches are not used to save overall DSP 1 power consumption. However, for a DSP 1 embodiment that contains instruction cache memory, incorporation of the decoded instruction buffer 22 can result in significant power consumption reduction, as shown in FIG. 8. The power savings shown for the instruction cache, control power consumption and instruction cache memory consumption is about 40% when the decoded instruction buffer 22 is used.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A low-power, integrated circuit digital signal processor comprising:

an arithmetic logic means having data inputs and data outputs, for performing decision making, arithmetic logic operations and data manipulation;

an array of data memory means having address inputs and data inputs and outputs, for storing data operands in different locations within said data memory means;

an address generation means having address outputs coupled to the address inputs of said data memory means, for generating addresses to access different storage locations within said data memory means;

an array of program memory means having address inputs and data inputs and outputs for storing instruction words in different locations within said instruction memory means; and a program control means having address outputs coupled to address inputs of said program memory, and data inputs coupled to the data outputs of said program memory means for accessing, storing and retrieving instruction words from said program memory means;

wherein said program control means includes an instruction fetching means for retrieving the instruction words, a variable decoder means for decoding the instruction words into control signals and operands, and a decoded instruction buffer means for storing decoded instruction words therein to avoid repeatedly fetching and decoding instruction words when executing program loops: said variable decoder means selectively storing decoded instruction words in said decoded instruction buffer or selectively outputting decoded instruction words for execution of the control signals and operands.

2. An integrated circuit digital signal processor according to claim 1 wherein said decoded instructions buffer means is composed of static random access memory cells.

3. An integrated circuit digital signal processor according to claim 2 wherein said static random access memory cells are comprised of a six transistor configuration.

4. An integrated circuit digital signal processor according to claim 1 wherein said decoded instructions buffer means is composed of read only memory cells.

5. An integrated circuit digital signal processor according to claim 4 further comprising subroutine programs stored in said decoded instruction buffer means.

6. An integrated circuit digital signal processor according to claim 1 wherein said decoded instructions buffer means is composed of a combination of static random access memory cells and read only memory cells.

7. Integrated circuit digital signal processor according to claim 6 further comprising a set of reduced sized instruction words permanently stored in said decoded instruction buffer means.

8. A method of reducing the power consumption of a digital signal processor having an arithmetic logic unit, an array of data memory, an address generation unit, an array of program memory, and a program control unit having an instruction fetch unit, an instruction decode unit and a buffer for storing decoded instructions, wherein the method comprises the steps of:

fetching at least one instruction from the program memory;

decoding the instruction into control signals:

storing the decoded instruction in the buffer:

retrieving the decoded instruction from the buffer instead of retrieving the instruction from the program memory for subsequent uses of the instruction; and powering down the instruction fetch unit and the decode unit while decoded instructions are being retrieved from the buffer.

9. A digital signal processor having a data execution unit for performing decision making, arithmetic logic operations and data manipulation; data memory coupled to the data execution unit; an address generation unit coupled to the data memory for addressing the data memory; and program memory for storing instruction words; said digital signal processor comprising:

- an instruction fetching unit coupled to the program memory for retrieving instruction words from the program memory;
- a decoder logic for decoding the instruction words into control signals and operands; and
- a decoded instruction buffer for storing decoded instruction words therein to avoid repeatedly fetching and decoding instruction;
- wherein said decode logic selectively communicates decoded instruction words to the data execution unit, or concurrently stores decoded instruction words in said decoded instruction buffer and communicates decoded instruction words to the data execution unit.

10. A digital signal processor according to claim 9 wherein said decoded instruction buffer comprises read only memory cells.

11. A digital signal processor according to claim 10 further comprising subroutine programs stored in said decoded instruction buffer.

12. A digital signal processor according to claim 9 wherein said decoded instruction buffer comprises static random access memory cells.

13. A digital signal processor according to claim 12 wherein said static random access memory cells are comprised of a six transistor configuration.

14. A digital signal processor according to claim 9 wherein said decoded instruction buffer comprises a combination of static random access memory cells and read only memory cells.

15. A digital signal processor according to claim 9 further comprising a set of reduced sized instruction words permanently stored in said decoded instruction buffer.

16. A method of reducing the power consumption of a digital signal processor having at least a data execution unit, a program memory, an instruction fetch unit, an instruction decode unit and a buffer for storing decoded instructions, said method comprising:

fetching instructions from the program memory;

decoding the instructions into control signals or operands;

selectively communicating the decoded instructions to the data execution unit, or concurrently communicating the decoded instructions to the data execution unit and storing the decoded instructions in the buffer; and selectively retrieving decoded instructions from the buffer instead of retrieving the instruction from the program memory, for use in repetitive program operations.

17. A method of reducing the power consumption of a digital signal processor according to claim 16 further comprising powering off the instruction fetch unit and the instruction decode unit while decoded instructions are being retrieved from the buffer.

* * * * *